(12) United States Patent
McCoy

(10) Patent No.: US 7,675,844 B2
(45) Date of Patent: Mar. 9, 2010

(54) SYNCHRONIZATION FOR OFDM SIGNALS

(75) Inventor: James W. McCoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 373 days.

(21) Appl. No.: 11/362,214

(22) Filed: Feb. 24, 2006

(65) Prior Publication Data

US 2007/0201349 A1 Aug. 30, 2007

(51) Int. Cl.
*H04J 11/00* (2006.01)
*H04J 3/06* (2006.01)

(52) U.S. Cl. .................. 370/208; 370/503; 375/354

(58) Field of Classification Search .............. 370/208, 370/203, 260, 347, 504, 343, 503, 509–514; 375/260, 316, 285, 346, 354, 362, 366; 455/562.1, 455/67.11; 330/149; 600/455
See application file for complete search history.

(56) References Cited

U.S. PATENT DOCUMENTS

| | | | |
|---|---|---|---|
| 5,463,716 A | 10/1995 | Taguchi | |
| 6,650,616 B2 | 11/2003 | Crawford | |
| 7,136,432 B2 | 11/2006 | Min et al. | |
| 7,206,350 B2 | 4/2007 | Korobkov et al. | |
| 7,280,621 B1 | 10/2007 | Murphy | |
| 7,330,697 B1 | 2/2008 | Bolt et al. | |
| 7,430,193 B2 | 9/2008 | Kim et al. | |
| 2002/0171485 A1* | 11/2002 | Cova | 330/149 |
| 2002/0191703 A1 | 12/2002 | Ling et al. | |
| 2003/0012302 A1* | 1/2003 | Webster et al. | 375/316 |
| 2003/0067999 A1 | 4/2003 | Echavarri et al. | |
| 2003/0112743 A1* | 6/2003 | You et al. | 370/203 |
| 2004/0052319 A1 | 3/2004 | Wakamatsu | |
| 2004/0203430 A1* | 10/2004 | Morris | 455/67.11 |
| 2005/0008067 A1 | 1/2005 | Lewis | |
| 2005/0008088 A1* | 1/2005 | Liu et al. | 375/260 |
| 2005/0063298 A1* | 3/2005 | Ling et al. | 370/208 |
| 2005/0063480 A1 | 3/2005 | Sang et al. | |
| 2005/0105647 A1* | 5/2005 | Wilhelmsson et al. | 375/316 |

(Continued)

OTHER PUBLICATIONS

Rongfang Song et al "A Novel OFDM Receiver with Second Order Polynomial Nyquist Window Function ", IEEE communications letters, vol. 9, No. 5, May 2005.*

(Continued)

*Primary Examiner*—Aung S Moe
*Assistant Examiner*—Awet Haile
(74) *Attorney, Agent, or Firm*—Charles W. Bethards

(57) ABSTRACT

A method of acquiring, at a receiver, fine timing synchronization for an Orthogonal Frequency Division Multiplexing (OFDM) signal as transported over a channel, includes determining an impulse response of the channel; dynamically creating a window function corresponding to the impulse response; and selecting a multiplicity of samples of the OFDM signal in accordance with the window function, where the multiplicity of samples are time aligned with an OFDM demodulator. A corresponding synchronizer includes a correlator for cross correlating a received preamble with a known preamble to provide an impulse response corresponding to the channel; a window generator configured to dynamically create a window function corresponding to the impulse response; and a selector configured to select a multiplicity of samples of the OFDM signal in accordance with the window function, where the multiplicity of samples are time aligned with a Fast Fourier Transform window associated with an OFDM demodulator.

22 Claims, 4 Drawing Sheets

U.S. PATENT DOCUMENTS

| | | | |
|---|---|---|---|
| 2005/0125176 A1 | 6/2005 | Makhlouf et al. | |
| 2005/0152326 A1 | 7/2005 | Vijayan et al. | |
| 2005/0169408 A1* | 8/2005 | Kim | 375/343 |
| 2006/0171493 A1* | 8/2006 | Kim et al. | 375/343 |
| 2006/0239367 A1* | 10/2006 | Wilhelmsson et al. | 375/260 |
| 2007/0019538 A1* | 1/2007 | Long et al. | 370/208 |
| 2007/0066362 A1* | 3/2007 | Ma et al. | 455/562.1 |
| 2007/0110174 A1* | 5/2007 | Glazko et al. | 375/260 |
| 2007/0167791 A1* | 7/2007 | Umemura et al. | 600/455 |

OTHER PUBLICATIONS

International Search Report for correlating PCT Patent Application No. PCT/US 07/62139 dated Apr. 7, 2008.

12.747 Lecture 6: Section 3: Sequence Analysis I: Uniform Series, Cross- and Auto-Correlation, and Fourier Transforms, File last modified Oct. 4, 1996, as cited by examiner in U.S. Appl. No. 11/247,481 on Oct. 15, 2008.

Convolution and Correlation, Updated Jul. 2, 1999, as cited by examiner in U.S. Appl. No. 11/247,481 on Oct. 15, 2008.

Office Action mailed Aug. 7, 2008 on related U.S. Appl. No. 11/247,481.

Office Action mailed Dec. 11, 2008 on related U.S. Appl. No. 11/247,481.

Office Action mailed Apr. 1, 2009 on related U.S. Appl. No. 11/247,481.

PCT/US06/39648 International Search Report and Written Opinion mailed 2008-03921 on PCT Appln. corresponding to related U.S. Appl. No. 11/247,481.

Office Action mailed Sep. 8, 2008 on related U.S. Appl. No. 11/284,675.

PCT/US06/60250 International Search Report and Written Opinion mailed Apr. 21, 2008 on PCT Appln. corresponding to related U.S. Appl. No. 11/284,675.

Office Action mailed Mar. 24, 2009 on related U.S. Appl. No. 11/460,847.

U.S. Appl. No. 11/460,847; Non-Final Office Action dated Oct. 7, 2009.

* cited by examiner

SYNCHRONIZATION FOR OFDM SIGNALS

RELATED APPLICATIONS

This application is related to US applications: U.S. Ser. No. 11/247,481 filed on Oct. 11, 2005; U.S. Ser. No. 11/284,675 filed on Oct. 21, 2005; and U.S. Ser. No. 11/460,847 filed on Jul. 28, 2006.

FIELD OF THE INVENTION

This invention relates in general to synchronization for orthogonal frequency division multiplexing (OFDM) signals and more specifically to techniques and apparatus for acquiring fine synchronization at a receiver for OFDM signals.

BACKGROUND OF THE INVENTION

Communication systems and air interface protocols that utilize or rely on OFDM modulation and signals are known and becoming more popular, particularly in systems with narrow bandwidth or multipath channels. OFDM signals employ a multitude of closely frequency spaced subcarriers where the creation of these subcarriers result in orthogonal subcarriers with relatively slower symbol rates on each carrier. OFDM modulation provides increased capacity in many situations, provided a receiver for the OFDM signals is a coherent receiver. A coherent receiver is a receiver that can be accurately synchronized in time and frequency with the transmitter, i.e., synchronized with the transmitted signal. This synchronization is required in order to maintain the orthogonality of the various subcarriers. The sensitivities of inter symbol and inter carrier interference to a lack of synchronization can be relatively large.

Various approaches are known for obtaining synchronization and most approaches initially use a course synchronization procedure that essentially provides frame synchronization and course frequency synchronization, e.g., within one subcarrier frequency spacing. After course synchronization has been acquired, various algorithms are utilized to further (fine) synchronize (in time and frequency) the receiver to the transmitted and thus received signal. The known approaches result in an interference floor for inter carrier or inter symbol interference (ICI, ISI) that may not be low enough for systems with large numbers of subcarriers or particularly complex channels (rapid fading, etc.). Furthermore, implementing known approaches typically require non-trivial amounts of processing resources. Thus new approaches for fine synchronization that offer significant improvements in performance with limited processing resources are desirable.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
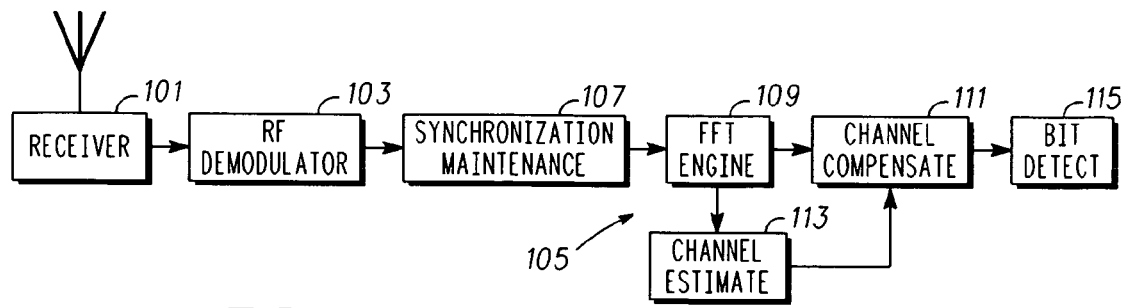
FIG. 1 depicts in a simplified and representative form, a high level diagram of a receiver configured to receive an orthogonal frequency division multiplexing signal in accordance with one or more embodiments.

In overview, the present disclosure concerns methods, apparatus, and systems configured to facilitate or acquire fine timing synchronization in a receiver that is arranged and constructed for receiving signals, e.g., OFDM signals or the like. More particularly various inventive concepts and principles embodied in methods and apparatus that dynamically create a window function based on a channel impulse response and select a multiplicity of samples of the OFDM signal in accordance with the dynamically created window function, where the samples are time aligned with an OFDM demodulator will be discussed and disclosed. The inventive concepts and principles when practiced in accordance with the discussions and teachings herein essentially result in minimizing ISI and ICI.

The receivers of particular interest may vary widely but include receivers configured to operate in systems using standards promulgated by the Institute of Electrical and Electronics Engineers (IEEE), e.g., the IEEE 802 family of standards that employ OFDM protocols and in particular IEEE 802.16e and like standards. In systems, equipment and devices that have stringent performance requirements or that utilize large numbers of subcarriers or have complex channels (fast fading, etc.) the disclosed apparatus and methods can be particularly advantageously utilized, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level diagram of a portion of a receiver configured to receive an orthogonal frequency division multiplexing signal in accordance with one or more embodiments will be briefly discussed and described. In FIG. 1, a receiver 101 that includes various radio frequency (RF) functions such as a low noise amplifier, filtering, a first mixer and the like, all as generally known in the art, is depicted. The output from the receiver 101 is a complex signal with in phase (I) and quadrature (Q) components at some intermediate frequency and this complex signal is coupled to an RF or IF demodulator 103. This demodulator 103 includes known functionality including, e.g., a further mixer and analog to digital converters and provides a digital or sampled I and Q signal, r(n) at the output. In some embodiments for example, the sample rate of this I and Q signal can be around 23 million samples per second (MS/s) with each sample on the order of 12 bits in length. The receiver 101 and RF demodulator may be referred to as part of the outer receiver in some OFDM literature.

The I and Q components or signals r(n) out of the RF demodulator are coupled to what may be referred to as an inner receiver 105 that begins with a synchronization function 107, which further includes a synchronization maintenance system or synchronizer. The synchronization function is responsible for course synchronization or alignment of frequency and time which is typically referred to as frame synchronization using well understood techniques and concepts. The synchronization maintenance system or synchronizer portion of 107 operates to acquire fine time and frequency synchronization as will be described and discussed in detail below with reference to one or more of FIG. 2-FIG. 7. Once fine synchronization has been acquired and the samples r(n) adjusted accordingly, the resultant signal or samples are passed to a Fast Fourier Transform (FFT) engine or OFDM demodulator 109. The FFT engine or demodulator converts OFDM symbols back to the multitude of subcarriers with their respective symbols. Certain of these symbols in some of the subcarriers some of the time are normally pilot symbols or information and this is used to compensate the subcarriers and symbols at a channel compensator 111 based on a channel estimate provided by channel estimator 113 all using understood techniques. The pilot symbols are adjusted so as to resemble as nearly as possible a known pilot symbol and the combination of adjustment defines a filter that may be used by or as the channel compensator 111. The output from the channel compensator can then be converted to bits or basic symbols at the detector 115 again all as known.

Figure 2:
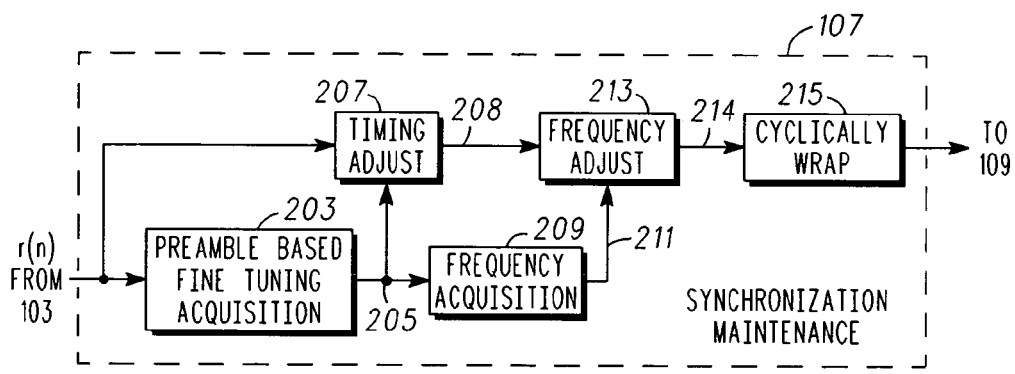
FIG. 2 in a representative form, shows a representative high level diagram of a synchronization maintenance system of the receiver of FIG. 1 in accordance with one or more embodiments.

Referring to FIG. 2, a representative high level diagram of a synchronization maintenance system or synchronizer used within the receiver of FIG. 1 in accordance with one or more embodiments will be briefly discussed and described. FIG. 2 shows an input r(n) from 103 being applied to a fine timing acquisition processor 203 as well as a timing adjustment block 207. The output 205 from the timing acquisition processor 203 includes a timing offset $t_0$, a channel impulse response length M, and window function w(n), each of which is coupled to the timing adjustment block 207 and to the frequency acquisition processor 209. The timing acquisition processor 203 finds the impulse response of the channel and based on that selects $t_0$ (first time offset with a significant value for the impulse response) and M (time lapse from first time offset to a second time offset beyond which the impulse response stays below some threshold value) and derives or creates w(n). The timing adjustment takes r(n) and forms $r(n+M+t_0/Ts)$ where Ts is the sampling period (e.g., time between r(n) and r(n+1)) and then multiplies w(n) by $r(n+M+t_0/Ts)$ to provide a result at output 208.

The frequency acquisition block 209 finds fc, supplies this at output 211, and the frequency adjustment block multiplies the result at 208 by a complex sinusoid with the argument nfc/fs, where fs is the sampling frequency, with the result supplied at the output 214. The cyclical wrap function operates on the result at 214 and supplies a wrapped version thereof to the FFT engine or OFDM demodulator 109. Much of the functionality described with reference to FIG. 2 will be described in further detail below with reference to FIG. 3-FIG. 6.

Figure 3:
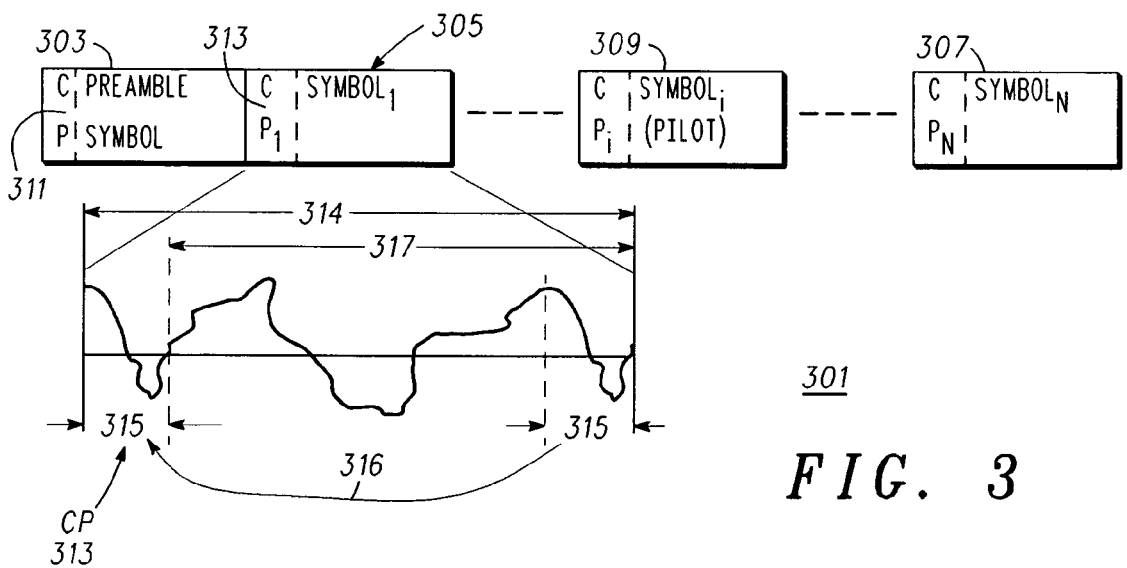
FIG. 3 depicts a representative diagram of one OFDM signal frame.

Referring to FIG. 3, a representative diagram of one OFDM signal frame will be described in order to establish some concepts and language for a further description of various inventive concepts and principles. FIG. 3 shows an OFDM frame 301 that includes one or more preamble symbols 303, where these symbols are predetermined or specified in accordance with the relevant air interface standards followed by a multiplicity of other OFDM symbols 305 through 307. One or more of these symbols, e.g., symbol 309, will include a pilot signal on one or more subcarriers. Each of these OFDM symbols includes a cyclic prefix (CP) or guard period or time, e.g., symbol 303 includes CP 311 and symbol 305 includes CP 313. OFDM symbol 305 has been expanded and shows a representative OFDM signal over a symbol period 314. As indicated and depicted, CP 313 is a copy of the right hand side 315 that has been pre-pended to the balance of the symbol or cyclically wrapped 316 to form the resultant OFDM symbol. The balance 317 of the symbol is the same length as the Inverse Fast Fourier Transform (IFFT) that is used at the transmitter or OFDM modulator to generate the OFDM symbol. This is the length of the FFT or FFT window $N_{fft}$ that needs to be used by the FFT demodulator 109 to demodulate the OFDM symbol. Thus $N_{fft}$+CP equals the symbol time period 314.

Figure 4:
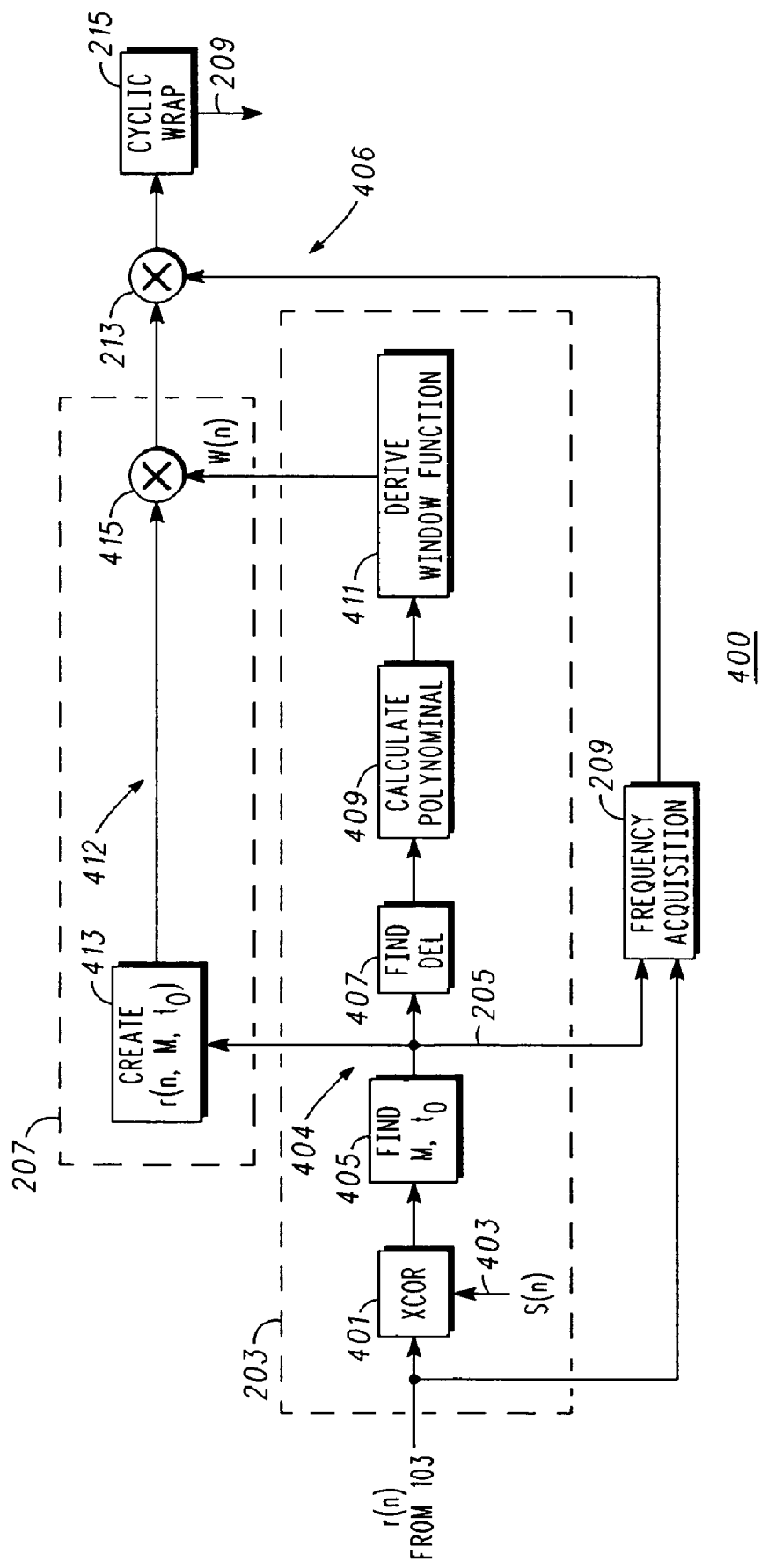
FIG. 4 depicts a representative and more detailed diagram of the synchronization maintenance system of FIG. 2 in accordance with one or more embodiments.

Referring to FIG. 4, a representative and more detailed diagram of the synchronization maintenance system of FIG. 2 in accordance with one or more embodiments will be described and discussed. FIG. 4 illustrates in more detail the synchronizer 400 that is configured to acquire fine time synchronization for an Orthogonal Frequency Division Multiplexing (OFDM) signal as well as a system 406 for facilitating acquisition of fine timing synchronization for an OFDM signal. The synchronizer 400 includes a correlator 401 for cross correlating, after course synchronization has been acquired, a received preamble r(n) of each of a plurality of OFDM symbols, e.g., preamble symbols 303, with a known preamble s(n) 403 to provide an impulse response corresponding to a channel associated with each of a plurality of OFDM symbols and thus OFDM signal. Note that for simplicity r(n) is being used to designate the input signal although it is understood that coarse time and frequency correction has been applied to these samples.

More specifically for each frame, the received preamble symbol, e.g., symbol 303, is cross correlated with the predetermined preamble symbol s(n) 403. This relies on the knowledge that the preamble symbol is sufficiently pseudo random to be approximated as white noise as well as the notion that the cross correlation between a filter output and the filter input when that input is white noise yields or results in a cross correlation that is the impulse response of the filter, i.e., in this instance the impulse response of the channel. Note that the cross correlation needs to extend from slightly earlier in terms of the samples n than the expected start of the CP portion of the preamble symbol to slightly later than the duration of the symbol (or at least the expected duration of the CP).

The cross correlation is coupled to a window generator 404 that can be configured to dynamically create a window function w(n) corresponding to the impulse response of the channel. In one or more embodiments the window function is created for each of a plurality of OFDM symbols, where the window function for an OFDM symbol has a duration L corresponding to an OFDM symbol period minus a length M of the impulse response of the channel for the OFDM symbol (see discussion below with reference to FIG. 6). This window function is typically created for each OFDM frame, i.e., created for each OFDM preamble symbol. The cross correlation from correlator 401 is first coupled to block 405, which operates to find M (length of the impulse response) and $t_0$. Finding to amounts to screening the values of the cross correlation until a first or earliest value that exceeds a threshold level is found, where $t_0/T_s$ is the corresponding time or sample number (n) where this occurs. Finding M amounts to examining the channel impulse response or cross correlation until the last or latest value that exceeds a threshold level is found. The difference between $t_0/T_s$ and this last value in terms of samples is M, the length of the impulse response.

The time offset $t_0$ and M are coupled at 205 to the selector 412, specifically timing adjustment 207 and more specifically a function 413 that creates r(n, M, $t_0$) as well the frequency acquisition processor 209 and a function 407 that finds or derives DEL (half of the difference between L and $N_{fft}$, where L is the symbol time period minus M). DEL from 407 is coupled to and used by a calculator function 409 to derive a polynomial that depends on DEL. The polynomial from 409 is coupled to and utilized by the derivation operation 411 to derive the window function w(n), which is coupled to the selector or specifically multiplier 415. Thus the window generator 404 includes the functions 405-411 and these along with the correlator 401 are part of the timing acquisition processor 203. The window generator in various embodiments is further configured to dynamically create a window function that depends on the difference between the duration L of the window function and a duration $N_{fft}$ of the Fast Fourier Transform window associated with the OFDM demodulator. Some embodiments of the window generator are further configured to dynamically create a window function in accordance with a polynomial Nyquist function as derived at 409. The window generator in still other embodiments, further described below, is further configured to dynamically create a window function in accordance with a seventh order polynomial Nyquist function that depends on half of the difference between the duration L of the window function and a duration $N_{fft}$ of the Fast Fourier Transform window associated with the OFDM demodulator. In some embodiments, the window generator is further configured to dynamically create a window function comprising a first portion in accordance with a polynomial, i.e., a first or upward transition region of the polynomial Nyquist function, a second portion set to unity, and a third portion in accordance with a time reversed version of the polynomial, i.e., a second or downward transition region of the polynomial Nyquist function.

The input signal r(n) as well as the window function w(n) are coupled to a selector 412 that is configured to select a multiplicity of samples of the OFDM signal in accordance with the window function, where the multiplicity of samples are time aligned with a Fast Fourier Transform window associated with the OFDM demodulator 109. The selector can be configured, e.g., multiplier 415, to multiply the window function w(n) by a multiplicity of received samples of the OFDM symbol corresponding to the duration L of the window function to provide resultant weighted samples. The resultant weighted samples from multiplier 415 have been time adjusted at 413 and weighted in accordance with w(n) at 415, where the function 413 and multiplier 415 can be part of the timing adjustment function 207.

The resultant weighted samples are coupled to a multiplier 213 and multiplied by a complex sinusoid with an argument depending on fc. This frequency fc corrects for the frequency error in the weighted samples. Note that fc can be determined at frequency acquisition processor 209 by performing an auto correlation on r(n), specifically auto correlating r(n) and r(n+ $N_{fft}$) taking advantage of the fact that the first part (CP) of any OFDM symbol is 100% correlated with the last portion of the OFDM symbol as noted with reference to FIG. 3 where the angle of the auto correlation will be directly related to fc. The output from multiplier 213 is then coupled to a cyclical wrap operation or function 215. Using this operation, the synchronizer or selector can be further configured to cyclically wrap any portion of the resultant weighted samples that extend beyond the Fast Fourier Transform window, where the Fast Fourier Transform window is centered within the window function and spans a duration $N_{fft}$, and the window function has a time offset equal to the length M of the impulse response.

FIG. 4 also shows a system 406 for facilitating acquisition of fine timing synchronization for an Orthogonal Frequency Division Multiplexed (OFDM) signal, where the system comprises the window generator 404 and selector 412. As somewhat of a review, the window generator can be configured to dynamically create a window function for each of a plurality of OFDM symbols, e.g., preamble symbols, with the window function having a duration L corresponding to an OFDM symbol period minus a length M of a channel impulse response. The selector can be configured to select a multiplicity of samples of the OFDM signal in accordance with the window function, where the multiplicity of samples are time aligned with a Fast Fourier Transform window associated with an OFDM demodulator.

In more detailed embodiments, the window generator is further configured to dynamically create a window function that depends on half of the difference between the duration L of the window function and a duration $N_{fft}$ of the Fast Fourier Transform window associated with the OFDM demodulator. The window generator can further advantageously be configured to dynamically create a window function in accordance with a polynomial Nyquist function that depends on half of the difference between the duration L of the window function and a duration $N_{fft}$ of the Fast Fourier Transform window associated with the OFDM demodulator. The window generator in various embodiments is further configured to dynamically create a window function comprising a first portion in accordance with the polynomial Nyquist function (transition region according to a polynomial), a second portion set to unity, and a third portion in accordance with a time reversed version of the polynomial Nyquist function (further transition region according to a time reversed version of the polynomial).

The selector in one or more embodiments is further configured to multiply, e.g., with multiplier 415, the window function by a multiplicity of samples corresponding to the duration L of the window function to provide resultant weighted samples and cyclically wrap, e.g., at 215, any portion of the resultant weighted samples that extend beyond the Fast Fourier Transform window spanning a duration $N_{fft}$ that is centered within the duration L and has a time offset exceeding, e.g., by DEL, the length M of the channel impulse response.

Figure 5:
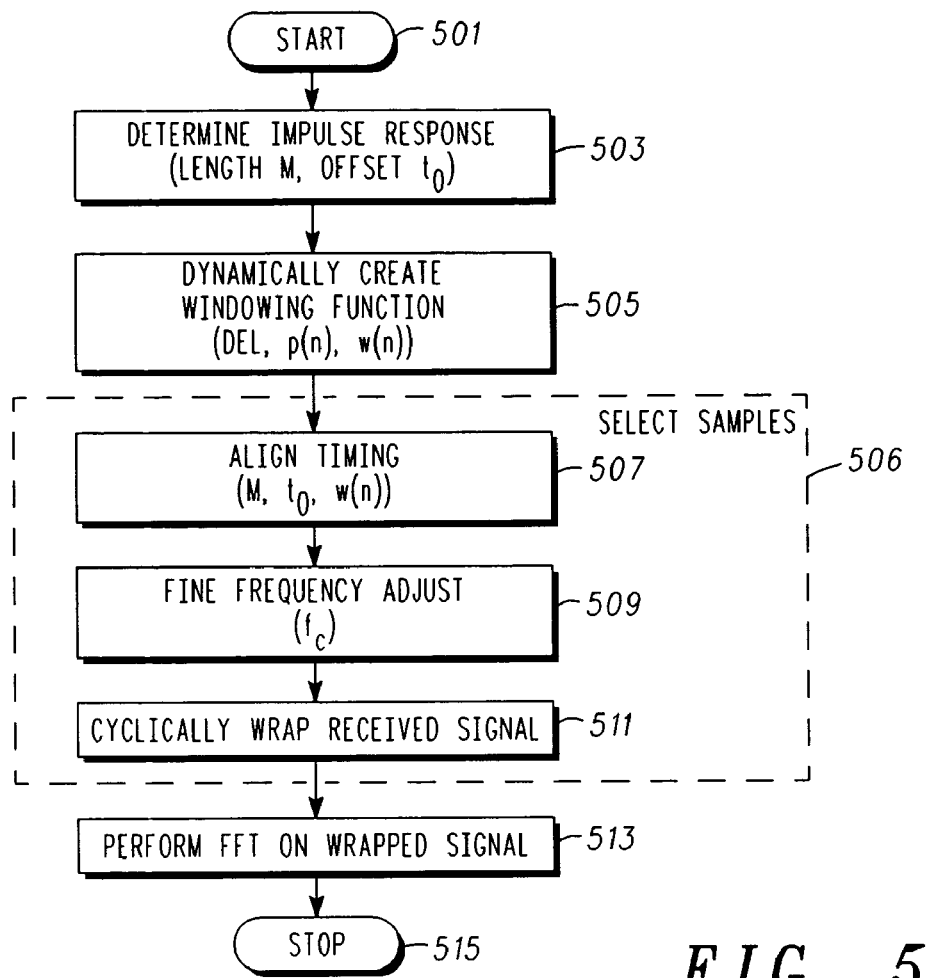
FIG. 5 shows a flow chart illustrating representative embodiments of a method of acquiring or maintaining fine timing synchronization in accordance with one or more embodiments.
Figure 6:
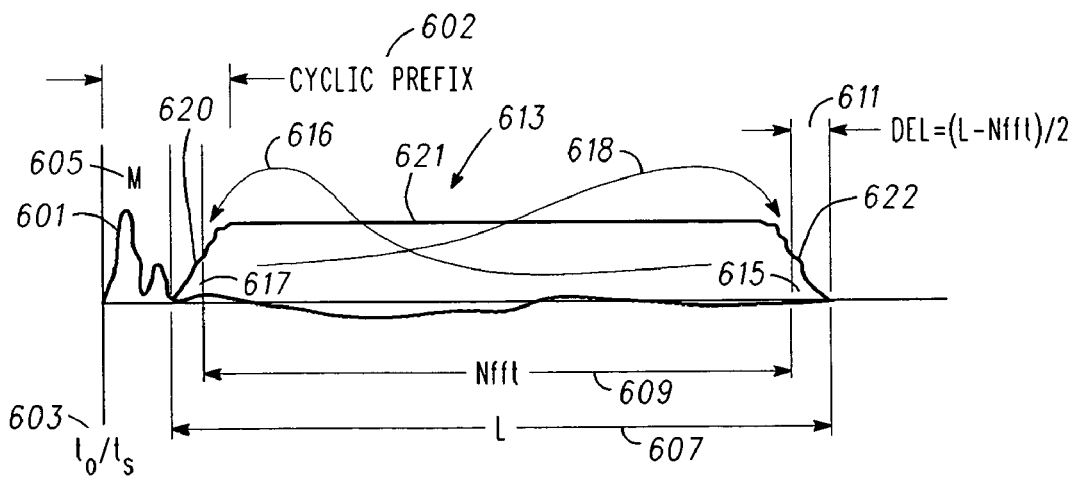
FIG. 6 illustrates a diagram that illustrates various operations of acquiring fine timing synchronization in accordance with one or more embodiments.

Referring additionally to FIG. 5 and FIG. 6, a flow chart illustrating various methods of acquiring fine timing synchronization as well as a diagram that illustrates various operations and functions all in accordance with various embodiments will be discussed and described. FIG. 5 shows a flow chart illustrating representative embodiments of methods of acquiring or maintaining fine timing synchronization in accordance with one or more embodiments. FIG. 6 illustrates a diagram that illustrates and is suitable for explaining various operations of acquiring fine timing synchronization. FIG. 5 illustrates at an overview level various methods associated with or of acquiring, at a receiver, fine timing synchronization for an Orthogonal Frequency Division Multiplexing (OFDM) signal as transported over a channel. It is understood that course synchronization (frequency and time) has been acquired, i.e., frame synchronization has been acquired via one or more known approaches prior to executing the methods of FIG. 5.

The method begins at 501 and then includes determining, after acquiring frame synchronization, an impulse response of the channel. Determining the impulse response relies on the notion that if a filter or any causal system is excited by white noise, the impulse response for that system is given by the cross correlation of the input and output signals. Hence in some embodiments, the determining the impulse response further comprises cross correlating a preamble, as received, of a data frame with a known preamble to provide the impulse response. Thus, provided the preamble is sufficiently white as in many systems, finding the impulse response of the channel can be done by evaluating a cross correlation between a known preamble s(n) and the received signal r(n) in accordance with:

$$IP(m) = \sum_n s(n+m)r^*(n),$$

i.e., form the summation over n of s(n+m) multiplied by the conjugate of r(n), where m should run or vary from slightly earlier than the worst case start for the preamble to slightly later than the end of the preamble symbol (Note if the cross correlation covers the cyclic prefix (CP) portion 602 of the preamble symbol that is ordinarily sufficient. This cross correlation can be performed with a correlator such as correlator 401 discussed above or other apparatus with similar capabilities. An exemplary and resultant cross correlation 601 is shown in FIG. 6 with increasing n along the horizontal axis and relative magnitude shown on the vertical axis. The determining the impulse response may further comprise finding a time position or time offset $t_0/T_s$ 603 where the impulse response begins (magnitude of impulse response exceeds a threshold) and finding a time position on the impulse response beyond which the magnitude or amplitude of the impulse response does not exceed a predetermined or threshold value, the latter time position defining an impulse response length M 605 that begins at $t_0/T_s$.

Two further processes are contemplated for a general method of acquiring time synchronization where these two processes or techniques can be viewed as directed to facilitating the acquisition of synchronization. The first of these is dynamically creating a window function w(n) 505 corresponding to the impulse response, e.g., using the window generator 404 or like functionality. Note that finding $t_0$ and M may be viewed as part of creating the window function w(n). The second is selecting a multiplicity of samples 506 of the OFDM signal in accordance with the window function, where the multiplicity of samples are time aligned with an OFDM demodulator, e.g., using the selector 412 or similar capabilities. The particular threshold values can be readily experimentally determined given a particular system, air interface standard, and performance objectives.

The dynamically creating a window function corresponding to the impulse response in one or more embodiments further comprises deriving a window function, where the window function 613 has a duration L 607 corresponding to an OFDM symbol or symbol period less an impulse response length M 605 of the impulse response. More specifically, deriving a window function further comprises deriving a window function that depends on the difference between the duration L of the window function and a Fast Fourier Transform duration $N_{fft}$ 609 associated with the OFDM demodulator. The deriving a window function can further comprise deriving a window function in accordance with a polynomial Nyquist function, where the polynomial Nyquist function depends on DEL 611, which equals half of the difference between L and $N_{fft}$. Note that deriving a window function in accordance with a polynomial Nyquist function can include deriving a window function comprising a first portion 620 (increasing portion or transition region) in accordance with a polynomial, a second portion 621 set to unity (constant portion), and a third portion 622 (decreasing portion or transition region) in accordance with a time reversed version of the polynomial. In one embodiment, the polynomial Nyquist function further comprises a seventh order polynomial for the transition regions.

The selecting a multiplicity of samples 506 of the OFDM signal in accordance with the window function w(n) includes the timing alignment 507 and cyclical wrapping 511 processes. The timing alignment 507 is analogous to 413, 415 and includes creating r(n, M, $t_0$) and further comprises multiplying the window function w(n) by r(n, M, $t_0$), i.e., a multiplicity of samples corresponding to the duration L of the window function to provide resultant weighted samples. After 507, fine frequency adjustment 509 removes a frequency error fc from each weighted sample provided by 507. Then the selecting the multiplicity of samples in accordance with the window function comprises cyclically wrapping 511 any portion of the resultant weighted samples that extend beyond a Fast Fourier Transform duration $N_{fft}$ that is centered within the window function w(n), where the window function has a duration L and a time offset equal to the impulse response length M. Referring to FIG. 6, this includes cyclically wrapping (adding) 616 the weighted samples 615 that extend beyond the right hand boundary of $N_{fft}$ to the weighted samples starting at and extending to the right from the left boundary of $N_{fft}$. Further included is cyclically wrapping (adding) 618 the weighted samples 617 that extend beyond the left hand boundary of $N_{fft}$ to the weighted samples starting at and extending to the left from the left boundary of $N_{fft}$.

After selecting and cyclically wrapping as noted above, the resultant $N_{fft}$ samples are suitable for ODFM demodulation and thus a Fast Fourier Transform can be performed on the resultant wrapped signal 513 and the method ends thereafter 515. It is noted that the method of FIG. 6 can be repeated as needed, e.g., with each new preamble symbol and thus with each new frame. It is also noted that the frequency compensation or adjustment can be performed on each OFDM symbol within each frame including the preamble symbol.

Referring to FIG. 6, one exemplary scenario according to an IEEE 802.16e air interface standard allows scaleable bandwidth to be utilized for the transport of information. The bandwidth can be scaled from around 1.25 MHz to around 20 MHz. At the 20 MHz channel bandwidth, 1702 OFDM carriers are used with each having 9.92 thousand symbols per second. At a sample rate of 22.856 MS/s, a given ODFM symbol including a frame preamble symbol can be 2304 samples in length, which includes a CP of 256 samples and $N_{fft}$ of 2048 samples. A representative channel can give rise to an impulse response length M of around 16 samples and thus L is approximately 2288 samples in length (256+2048=2304 and 2304−16=2288). This results in DEL=120 samples (2288−2048=240 and 240/2=120).

Referring to FIG. 1-FIG. 6, some additional detail including more specific mathematical support for certain operations or functions including derivation of one or more embodiments of a window function will now be discussed and described. As is known the transmit signal in an OFDM system can be represented as:

$$tx(n) = \sum_{m=0}^{Nfft-1} X(m)e^{j2\pi nm/Nfft}$$

which will be recognized as an Inverse FFT of X(m) (where X(m) is the coded symbol for the mth subcarrier in the frequency domain) over a window that is Nfft in length. A cyclic prefix CP is added to this signal. A corresponding signal as received at a receiver can be represented as:

$$rx(n) = e^{j2\pi f_\Delta n/f_s}\sum_{i=1}^{M} \alpha_i tx(n-i-t_0/T_s) + \eta(n),$$

where the index "i" refers to the i'th multipath, η(n) refers to additive noise, $t_0$ is a timing error, and $2\pi f_\Delta n$ is the error of the nth sample given a frequency error or mismatch of $f_\Delta$ (alternatively referred to as fc herein) between the transmitter and receiver. The signal at the output of the multiplier 213 or after the operation at 509 can be represented as:

$rx_2(n) = e^{-j2\pi f_\Delta n/f_s} w(n)rx(n+M+t_0/T_s)$, where rx(n+M+$t_0/T_s$) is the result of the timing adjust function 413 and w(n)rx(n+M+$t_0/T_s$) is the output of the multiplier 415 (or process at 507).

The result of the cyclical wrapping process 511 or cyclical wrap function 215 can be represented as:

$rx_3(n)$=cyclically wrap($rx_2(n)$), and the output of the OFDM demodulator or FFT engine is:

$$Rx(m) = e^{j2\pi(m+Nfft/2)(t_0/T_s)/Nfft}\sum_{n=0}^{Nfft-1} rx_3(n)e^{-j2\pi nm/Nfft}.$$

Creating or deriving the window function in one or more embodiments includes the operations or processes discussed and described as follows. By defining R according to:

R=2 (DEL/Nfft); and then defining t incremental according to:

tinc=−R:(2R)/(DEL−1):R, i.e., the values from −R to R with a step size of 2R/(DEL−1); and then calculating the matrix dm according to:

$$dm = \begin{bmatrix} R & R^3 & R^5 & R^7 \\ 1 & 3R^2 & 5R^4 & 7R^6 \\ 0 & 6R & 20R^3 & 42R^5 \\ 0 & 6 & 60R^2 & 210R^4 \end{bmatrix}, \text{ and } \begin{bmatrix} k1 \\ k2 \\ k3 \\ k4 \end{bmatrix} = dm^{-1}\begin{bmatrix} 0.5 \\ 0 \\ 0 \\ 0 \end{bmatrix};$$

a polynomial, e.g., $7^{th}$ order polynomial, can be derived or computed on a dynamic basis with each change in DEL (i.e., for each new preamble symbol and thus frame in accordance with:

poly=0.5+k(1)tinc+k(2)tinc$^3$+k(3)tinc$^5$+k(4)tinc$^7$.

Given the polynomial, a window function w(n) in accordance with a polynomial Nyquist function can be derived as the polynomial over the first portion 620 (extends for 2DEL samples), as all ones (1) over the second portion 621 (extends for L−4DEL samples), and as a time reversed and offset version of the polynomial over the third portion 622 (extends for 2DEL samples). This may be written in MATLAB (well known simulation program) form as:

w(n)=[poly; ones([1 L−4*DEL]); fliplr(poly)].

Figure 7:
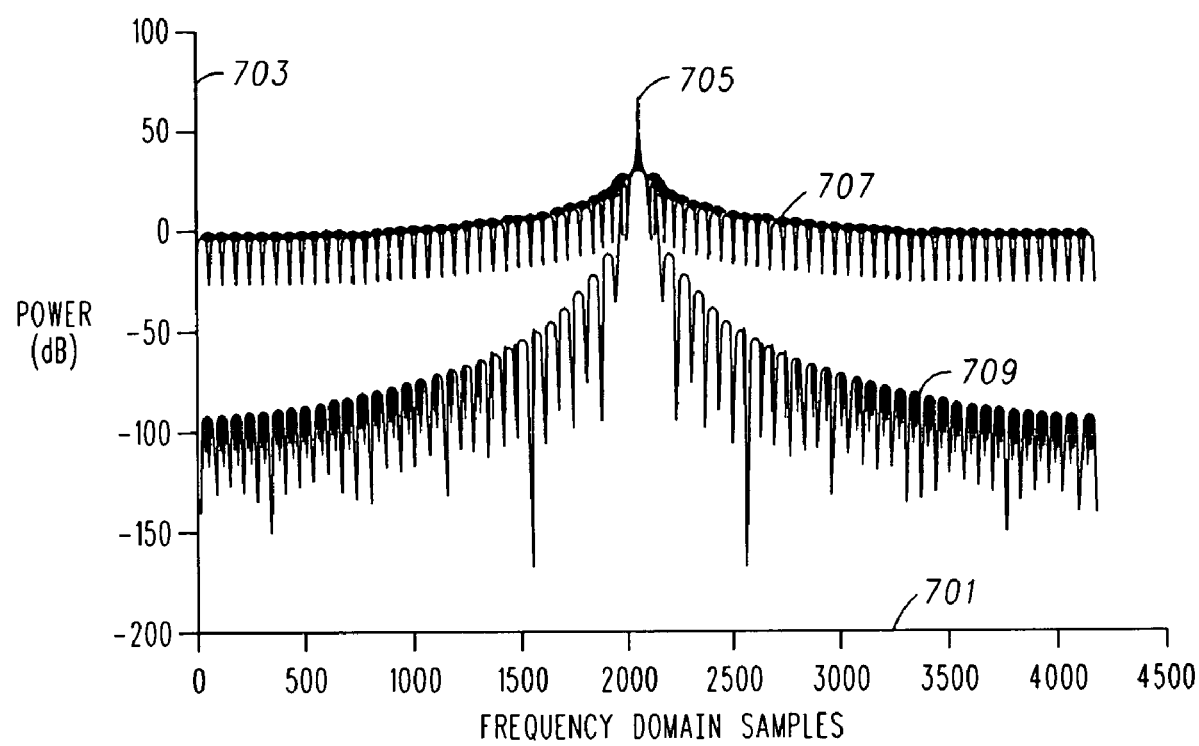
FIG. 7 illustrates simulated performance data for a receiver using one or more of the disclosed approaches for acquiring fine timing synchronization.

Referring to FIG. 7, simulated performance data for a receiver using one or more of the disclosed approaches for acquiring fine timing synchronization will be discussed and described. FIG. 7 shows frequency domain samples on the horizontal axis 701 and relative amplitude on the vertical axis. The simulated conditions include a channel according to an ITU.A (vehicular A channel model) using a speed of 250 Kilometers/hour. The International Telecommunications Union-Radiocommunications (ITU-R) is a standards body that has published various documents that facilitate various standard measurements and thus comparisons of performance between competing equipment. One such standard is ITU-R M.1225 that describes Guidelines for evaluation of radio transmission technologies for International Mobile Telecommunications-2000 (IMT-2000) which includes various channel models including the vehicular A model. Essentially one OFDM carrier includes a signal with a signal level 705 and the graph plots the amount of interference (ICI and ISI) that is present on other OFDM carriers as a result of the dispersive nature of the channel using known techniques for fine timing acquisition (curve 707) versus the disclosed techniques where a dynamic window is derived on a frame by frame basis and used to facilitate timing acquisition, i.e., facilitate demodulation of the OFDM signal. By observation of curve 707, the noise floor using conventional techniques is somewhere around 50 dB below the on channel signal level for the simulated channel. In contrast, the curve 709 continues to fall as the frequency spacing from the on channel is increased and approaches a level that is 100 dB below the on channel signal level 705. While 50 dB may be sufficient in some systems with relatively small number (50-100 or so) of OFDM carriers, present systems that are being proposed include several thousand carriers. If each of the several thousand carriers contributes interference that is 50 dB down the additive nature of this interference can become problematic. Thus the inventive approaches that tend to minimize ICI and ISI are a significant improvement over known techniques.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of acquiring, at a receiver, fine timing synchronization for an Orthogonal Frequency Division Multiplexing (OFDM) signal as transported over a channel, the method comprising: in the receiver;
    determining, after acquiring frame synchronization, an impulse response of the channel,
    dynamically creating a window function corresponding to the impulse response; and
    selecting a multiplicity of samples of the OFDM signal in accordance with the window function, the multiplicity of samples time aligned with an OFDM demodulator;
    wherein the dynamically creating a window function corresponding to the impulse response further comprises deriving a window function with a duration L corresponding to an OFDM symbol less a length of the impulse response (M), and
    wherein the deriving a window function further comprises deriving a window function with a transition portion in accordance with a seventh order polynomial Nyquist function.

2. The method of claim 1 where the determining the impulse response further comprises cross correlating a received preamble of a data frame with a known preamble to provide the impulse response.

3. The method of claim 1 where the determining the impulse response further comprises finding time positions on the impulse response beyond which an amplitude of the impulse response does not exceed a predetermined value, a difference between the time positions defining a length of the impulse response (M).

4. The method of claim 1 where the deriving a window function further comprises deriving a window function that depends on the difference between the duration L of the window function and a Fast Fourier Transform duration $N_{fft}$ associated with the OFDM demodulator.

5. The method of claim 1 where the deriving a window function with a transition position in accordance with a seventh order polynomial Nyquist function further comprises deriving a window function comprising a first portion in accordance with a polynomial, a second portion set to unity, and a third portion in accordance with a time reversed version of the polynomial.

6. The method of claim 1 where the deriving a window function in accordance with a polynomial Nyquist function further comprises deriving a window function with a plurality of transition portions in accordance with a seventh order polynomial Nyquist function.

7. The method of claim 1 where the selecting a multiplicity of samples of the OFDM signal in accordance with the window function further comprises multiplying the window function by a multiplicity of samples corresponding to the duration L of the window function to provide resultant weighted samples.

8. The method of claim 7 where the selecting a multiplicity of samples of the OFDM signal in accordance with the window function further comprises cyclically wrapping any portion of the resultant weighted samples that extend beyond a Fast Fourier Transform duration $N_{fft}$ that is centered within the window function, the window function having a duration L and a time offset equal to M.

9. The method of claim 1, wherein the deriving a window function in accordance with a seventh order polynomial Nyquist function, further comprises deriving s window function where the window function has a derivative that is continuous over the window function.

10. A synchronizer configured to acquire fine time synchronization for an Orthogonal Frequency Division Multiplexed (OFDM) signal, the synchronizer comprising:
    a correlator for cross correlating, after course synchronization has been acquired, a received preamble of each of a plurality of OFDM symbols with a known preamble to provide an impulse response corresponding to a channel associated with the each of a plurality of OFDM symbols;
    a window generator configured to dynamically create a window function for the each of a plurality of OFDM symbols, the window function for an OFDM symbol having a duration L corresponding to an OFDM symbol period minus a length M of the impulse response for the OFDM symbol; and
    a selector configured to select a multiplicity of samples of the OFDM signal in accordance with the window function, where the multiplicity of samples are time aligned with a Fast Fourier Transform window associated with an OFDM demodulator,
    wherein the window generator is further configured to dynamically create a window function having a transition portion in accordance with a seventh order polynomial Nyquist function.

11. The synchronizer of claim 10 where the window generator is further configured to dynamically create a window function that depends on the difference between the duration L of the window function and a duration $N_{fft}$ of the Fast Fourier Transform window associated with the OFDM demodulator.

12. The synchronizer of claim 10 where the window generator is further configured to dynamically create a window function in accordance with a seventh order polynomial Nyquist function that depends on half of the difference between the duration L of the window function and a duration $N_{fft}$ of the Fast Fourier Transform window associated with the OFDM demodulator.

13. The synchronizer of claim 10 where the window generator is further configured to dynamically create a window function comprising a first portion in accordance with a polynomial, a second portion set to unity, and a third portion in accordance with a time reversed version of the polynomial.

14. The synchronizer of claim 10 where the selector is further configured to multiply the window function by a multiplicity of received samples of the OFDM symbol corresponding to the duration L of the window function to provide resultant weighted samples.

15. The synchronizer of claim 14 where the selector is further configured to cyclically wrap any portion of the resultant weighted samples that extend beyond the Fast Fourier Transform window, the Fast Fourier Transform window centered within the window function and spanning a duration $N_{fft}$, the window function having a time offset equal to the length M of the impulse response.

16. The synchronizer of claim 10 wherein the window generator is further configured to dynamically create a window function in accordance with a polynomial Nyquist function where the window function has a derivative that is continuous over the window function.

17. The synchronizer of claim 10 wherein the window generator is further configured to dynamically create a window function with a plurality of transition portions in accordance with a seventh order polynomial Nyquist function.

18. A system for facilitating acquisition of fine timing synchronization for an Orthogonal Frequency Division Multiplexing (OFDM) signal, the system comprising:
a window generator configured to dynamically create a window function for each of a plurality of OFDM symbols, the window function having a duration L corresponding to an OFDM symbol period minus a length M of a channel impulse response; and
a selector configured to select a multiplicity of samples of the OFDM signal in accordance with the window function, where the multiplicity of samples are time aligned with a Fast Fourier Transform window associated with an OFDM demodulator,
wherein the window generator is further configured to dynamically create a window function having a transition portion in accordance with a seventh order polynomial Nyquist function that depends on half of the difference between the duration L of the window function and a duration $N_{fft}$ of the Fast Fourier Transform window associated with the OFDM demodulator.

19. The system of claim 18 where the window generator is further configured to dynamically create a window function comprising a first portion in accordance with a polynomial, a second portion set to unity, and a third portion in accordance with a time reversed version of the polynomial.

20. The system of claim 18 where the selector is further configured to multiply the window function by a multiplicity of samples corresponding to the duration L of the window function to provide resultant weighted samples and cyclically wrap any portion of the resultant weighted samples that extend beyond the Fast Fourier Transform window spanning a duration $N_{fft}$ that is centered within the duration L and has a time offset exceeding the length M of the channel impulse response.

21. The system of claim 18 wherein the window generator is further configured to dynamically create a window function in accordance with a polynomial Nyquist function where the window function has a derivative that is continuous over the window function.

22. The system of claim 18 wherein the window generator is further configured to dynamically create a window function with a plurality of transition portions in accordance with a seventh order polynomial Nyquist function.

* * * * *